United States Patent [19]

Sublett

[11] Patent Number: 5,017,680

[45] Date of Patent: May 21, 1991

[54] PROCESS AND CATALYST-INHIBITOR SYSTEMS FOR PREPARING POLY(ETHYLENE TEREPHTHALATE)

[75] Inventor: Bobby J. Sublett, Kingsport, Tenn.

[73] Assignee: Eastman Kodak Company, Rochester, N.Y.

[21] Appl. No.: 547,702

[22] Filed: Jul. 3, 1990

[51] Int. Cl.$^5$ .................. C08G 63/02; C08G 63/04; C08G 63/34; C08G 63/38

[52] U.S. Cl. .................. 528/274; 528/272; 528/275; 528/279; 528/280; 528/285; 528/286

[58] Field of Search ............... 528/272, 274, 275, 279, 528/285, 286, 280

[56] References Cited

U.S. PATENT DOCUMENTS

| | | | |
|---|---|---|---|
| 3,907,754 | 9/1975 | Tershansy | 528/277 |
| 3,962,189 | 6/1976 | Russin et al. | 528/277 |
| 4,010,145 | 3/1977 | Russin et al. | 528/280 |
| 4,356,299 | 10/1982 | Cholod et al. | 528/279 |
| 4,357,461 | 11/1982 | Go et al. | 524/724 |
| 4,361,681 | 11/1982 | Bernhardt | 525/444 |

OTHER PUBLICATIONS

U.S. patent application Ser. No. 547,747, "Process and Catalyst-Inhibitor Systems for Preparing Poly(1,4-cyclohexenedimethylene terephthalate)", filed Jul. 3, 1990.

*Primary Examiner*—Morton Foelak
*Assistant Examiner*—T. Mosley
*Attorney, Agent, or Firm*—John F. Stevens; William P. Heath, Jr.

[57] ABSTRACT

Disclosed is a polymer and process for producing the polymer using a complex of titanium alkoxide with an alkali or alkaline earth metal salt.

12 Claims, No Drawings

PROCESS AND CATALYST-INHIBITOR SYSTEMS FOR PREPARING POLY(ETHYLENE TEREPHTHALATE)

TECHNICAL FIELD

This invention relates to an improved process and catalyst-inhibitor system for preparing synthetic linear polyesters and copolyesters from dimethyl terephthalate and ethylene glycol. By using a complex of titanium and alkali or alkaline earth metal salt in the catalyst-inhibitor system, fast reaction rates and reduced acetaldehyde generation rate are realized.

BACKGROUND OF THE INVENTION

Difficulties have been encountered in the manufacture of poly(ethylene terephthalate) by the ester interchange reaction. Obviously, highly purified dimethyl terephthalate and highly purified glycol are preferred starting materials in order to form a high quality product. However, even these highly purified materials are very sluggish with respect to ester interchange and in the case of less purified materials the reaction is too slow for practical commercial operation. Because of this slow rate of reaction, it has been found essential, in commercial operation, to employ a suitable catalyst to speed up the reaction.

Many catalysts have been proposed for the ester interchange and polycondensation reactions in the manufacture of poly(ethylene terephthalate). These catalysts have not proven to be entirely satisfactory as fibers, films and plastic parts produced from the condensation polymers using these catalysts do not possess the desired whiteness or lack of objectionable color and/or the desired stability.

It is well known in the art that thermoplastic polyesters comprising ethylene glycol terephthalate regularly recurring units constitute valuable starting materials for the packaging of food products, especially in the form of bottles intended for storing carbonated beverages. One of the essential properties is that a catalyst be used to provide a transesterification and polycondensation rate to be commercially attractive and to be fast enough to minimize by-products and side reactions which are inherent with slow transesterification and polycondensation reactions in poly(ethylene terephthalate). Another essential property which packaging material fabricated from polymeric substance must possess is the absence of any compound or additive which is capable of migrating into the food product or drink and of impairing its taste or smell. It is known that poly(ethylene terephthalate) and copolymers of poly(ethylene terephthalate) resins release acetaldehyde by degradation and thus possess a strong smell and a characteristic taste which appear at extremely low concentrations. The aforesaid problem is particularly significant and acute in packaging (bottling) of mineral water and carbonated beverages. Thus, polyester bottles intended for aerated mineral water and carbonated beverages must have a very low acetaldehyde concentration. The minimum level of acetaldehyde required in a polyester bottle is set by the manufacture of a given product and the minimum can be higher or lower depending on the specific product being bottled. Therefore, any process or technique which will further reduce the acetaldehyde concentration in a polyester or copolyester bottle would be desirable and an advantage to those who package their products in polyester bottles. The amount of acetaldehyde present in the finished shaped articles depends both on the residual amount present in the polyester granules, before they are converted, and on the amount formed during the conversion in the molten state, as a result of degradation under the conditions of shear and temperature which are required for molding.

This invention is related to a specific catalyst system for poly(ethylene terephthalate) and copolyesters of poly(ethylene terephthalate) produced from dimethyl terephthalate. The catalyst comprises a titanium/alkali metal or alkaline earth metal complex, along with certain other conventional catalyst-inhibitor materials. The polyester produced has a fast polycondensation rate suitable for commercial production of polyester and has a reduced acetaldehyde generation rate as measured by head space analysis.

There are numerous techniques and processes in the literature for the reduction of acetaldehyde generation rate in poly(ethylene terephthalate), the reduction of acetaldehyde in the finished article, and the thermal stabilization of polyesters to prevent or reduce the amount of acetaldehyde produced during the process or forming the finished article. There are also many examples in the literature where alkaline or alkali metal salts are included in the reaction mix of poly(ethylene terephthalate) and poly(ethylene terephthalate) copolymers to achieve certain desirable effects and improvements in polymer properties, none of which disclose the use of alkali and alkali metal salts to reduce the quantity of acetaldehyde produced when the polymer is used as a packaging material. Also, there are only a few disclosures of titanium catalyst systems being used as a catalyst system for poly(ethylene terephthalate) which produces a useful product and these are mostly for films and fibers and not for packaging materials.

The present invention is based on a catalyst stabilizer system containing compounds of (1) manganese, zinc or calcium, (2) antimony, (3) cobalt, (4) phosphorus, (5) titanium and (6) alkali or alkaline earth metal salts.

It is well known in the art that the titanium catalyzed reaction of dimethylterephthalate and ethylene glycol provides the fastest polycondensation rates of any known catalyst for the preparation of poly(ethylene terephthalate). It is also well known in the art that titanium catalyzed poly(ethylene terephthalate) produces a yellow colored polymer. Therefore, to be a useful product, titanium catalyzed poly(ethylene terephthalate) must contain a color inhibitor or stabilizer such as phosphorus compounds and/or cobalt compounds or blue toner pigments to provide sufficient color stabilization to make titanium catalyzed poly(ethylene terephthalate) a commercially acceptable product.

U.S. Pat. No. 3,907,754 discloses a catalyst-inhibitor system containing titanium, manganese, cobalt, phosphorus for poly(ethylene terephthalate) which provides a fast reaction (production) rate and polymer with good color. This patent does not disclose antimony or an alkali metal salt as part of this catalyst combination, and does not address acetaldehyde generation. U.S. Pat. No. 3,962,189 discloses manganese, titanium, cobalt, phosphorus plus an alkali metal salt which is used to produce poly(ethylene terephthalate) with fast reaction rate, good color and an alkali metal salt in low concentration (2 to 32 ppm) to prevent a batho-chromic dye shift when the polyester is spun into fiber and dyed. This patent does not include antimony in the catalyst inhibitor system, and does not address acetaldehyde generation. U.S. Pat. No. 4,010,145 discloses a manganese, titanium, cobalt, phosphorus antimony catalyst inhibitor system for producing poly(ethylene terephthalate) at a fast rate with good color. There is no alkali metal salt disclosed in this patent and does not address acetaldehyde generation. U.S. Pat. No. 4,356,299 discloses a titanium, antimony, manganese, cobalt, and phosphorus catalyst system for producing poly(ethylene terephthalate) at fast rate with good color. This patent is for a reduced titanium concentration to provide good color and fast reaction rate, and does not address acetaldehyde generation. U.S. Pat. No. 4,357,461 discloses the use of an alkali metal salt of ethylenediamine-tetra acetic acid to reduce the acetaldehyde generation rate inherent in preparation and processing of poly(ethylene terephthalate) for packaging. However, this patent does not address the use of a titanium catalyzed polyester. U.S. Pat. No. 4,361,681 discloses the use of dicarboxylic acid anhydrides to reduce acetaldehyde in the preparation and processing of poly(ethylene terephthalate) for packaging and uses, namely bottles. This patent addresses the post treatment of previously prepared polymer to reduce hydroxyethyl ends and thus reduce acetaldehyde.

DESCRIPTION OF INVENTION

This invention provides a catalyst system for polyesters and copolyesters with reduced acetaldehyde generation rate and other titanium catalyzed polyesters with improved stability. It is surprising and unexpected that the acetaldehyde generation rate of poly(ethylene terephthalate) can be reduced by using a catalyst system comprising titanium alkoxide catalyst complexed with an alkali or alkaline earth metal salt.

The present invention provides a process for producing polyesters comprising reacting dimethyl terephthalate with ethylene glycol and combinations of ethylene glycol with up to about 10 mol % 1,4-cyclohexanedimethanol at a temperature sufficient to effect ester interchange and in the presence of a catalyst system comprising (a) manganese, zinc or calcium salts wherein the manganese, zinc or calcium is present in an amount of about 25-110 ppm,
(b) cobalt salts wherein the cobalt is present in an amount of about 10-100 ppm,
(c) an antimony compound wherein the antimony is present in an amount of about 150-350 ppm,
(d) a phosphorus compound wherein the phosphorus is present in an amount of about 15-240 ppm, and
(e) a complex of titanium alkoxide with an alkali or alkaline earth metal salt wherein the titanium is present in an amount of about 10-100 ppm titanium and wherein the metal to titanium atom ratio is at least 0.25:1, the ppm in (a) through (e) above being by weight based on the acid fraction of the polyester.

The dimethyl terephthalate referred to herein may contain up to about 5 mol % dimethyl isophthalate.

The reaction is carried out using conventional reaction conditions.

In the preparation of poly(ethylene terephthalate), by means of the ester interchange reaction, the process comprises two steps. In the first step, ethylene glycol and dimethyl terephthalate are reacted at elevated temperatures and atmospheric pressure to form bis-2-hydroxyethyl terephthalate (BHET) and methanol, which is removed. Thereafter the BHET is heated under still higher temperatures and under reduced pressure to form poly(ethylene terephthalate) with the elimination of glycol, which is readily volatilized under these conditions and removed from the system. The second step, or polycondensation step, is continued until a polymer having the desired degree of polymerization, determined by inherent viscosity, is obtained. Without the aid of a suitable catalyst, the above reactions do not proceed at a suitable rate.

Typical processes are disclosed, for example, in U.S. Pat. No. 3,962,189.

The catalysts according to this invention, with the exception of the phosphorus component, may be added to the reaction mix at the beginning, i.e., prior to transesterification. In any case the antimony, cobalt, titanium, alkali or alkaline earth metal salt, phosphorus and manganese (or zinc or calcium) should be added prior to polycondensation.

Examples of suitable manganese salts are manganous benzoate tetrahydrate, manganese chloride, manganese oxide, manganese acetate, manganese acetylacetonate, manganese succinate, manganese diethyldithiocarbamate, manganese antimonate, manganate phosphate monohydrate, manganese glycol oxide, manganese naphthenate, and manganese salicyl salicylate.

Examples of suitable zinc compounds include zinc acetate, zinc phosphate monohydrate, zinc succinate, and zinc glycoxide, etc.

Examples of suitable calcium compounds include calcium acetate, calcium glycoxide, and calcium phosphate monohydrate, etc.

Examples of suitable cobalt salts are cobaltous acetate trihydrate, cobaltous nitrate, cobaltous chloride, cobalt acetylacetonate, cobalt naphthenate, and cobalt salicyl salicylate.

Examples of suitable antimony compounds include antimony triacetate, antimony trioxide, antimony glycolate (either formed separately or during polymerization), and the like, with antimony glycolate being preferred.

The preferred phosphate ester has the formula

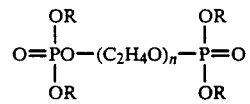

wherein n has an average value of 1.5 to about 3.0 with about 1.8 being most preferred and each R is hydrogen or an alkyl radical having from 6 to 10 carbon atoms with octyl being most preferred, the ratio of the number of R groups of hydrogen atoms to the number of phosphorus atoms being about 0.25 to 0.50 with about 0.35 being most preferred; and the ester having a free acidity equivalent of about 0.2 to 0.5, the ester being present in the amount to provide phosphorus in the amounts of 13-240 parts per million based on the acid fraction of the polyester to be produced. Other phosphate esters useful in this invention include ethyl acid phosphate, diethyl acid phosphate, triethyl acid phosphate, arylalkyl phosphates, tris-2-ethylhexyl phosphate and the like.

The phosphate ester may be used in an amount to provide phosphorus at a concentration such that the atom ratio of the amount of phosphorus to the sum of the amounts of cobalt, manganese, and titanium is between 1.0 and 2.0 i.e., $$1.0 \leq \frac{[P]}{[Co] + [Mn] + [Ti]} \leq 2.0$$

where [ ] in each case refers to the number of gram atoms of respective components. (Gram atoms of any element = weight of the element in grams ÷ the atomic weight of the element in grams).

The complex of titanium alkoxide and alkali or alkaline earth metal salt may be prepared prior to addition to the reaction mixture or may be formed in situ.

Examples of useful titanium alkoxides are acetyl, triisopropyl titanate, titanium tetraisopropoxide, titanium glycolates, titanium butoxide, hexyleneglycol titanate, tetraisooctyl titanate, and the like. Titanium tetraisopropoxide is preferred.

Examples of some suitable organic salts of alkali metals or alkaline earth metals used in this invention are sodium carbonate, sodium acetate, sodium benzoate, sodium succinate, sodium acetylacetonate, sodium methoxide, sodium ethoxide, sodium dioxide, lithium carbonate, lithium acetate, lithium benzoate, lithium succinate, lithium acetylacetonate, lithium methoxide, lithium ethoxide, lithium glycoxide, potassium carbonate, potassium acetate, potassium benzoate, potassium succinate, potassium acetylacetonate, potassium methoxide, potassium ethoxide, potassium glycoxide, calcium acetate, calcium benzoate, calcium succinate, calcium acetylacetonate, calcium methoxide, calcium ethoxide, calcium glycoxide, magnesium acetate, magnesium benzoate, magnesium succinate, magnesium acetylacetonate, magnesium methoxide, magnesium ethoxide, magnesium glycoxide, barium acetate, barium benzoate. Preferred salts include sodium, lithium and potassium carbonate.

The catalyst system described above is the preferred system for poly(ethylene terephthalate) and provides a titanium/metal complex catalyst for reducing acetaldehyde generation rate.

Inherent viscosity is measured at 25° C. using 0.5 g polymer per 100 mL of a solvent consisting of 60% by weight phenol and 40% by weight tetrachloroethane. The basic method is set forth in ASTM D-2857-70.

The method used for calculating catalyst metal concentrations in poly(ethylene terephthalate) for purposes of this specification may be illustrated as follows. The poly(ethylene terephthalate) is prepared in 0.60 gram mole batches. The polymer's repeat unit empirical formula is $C_{10}H_8O_4$, and its gram molecular weight thus is 192.16 g. A 0.60 mole batch yields, therefore, 115.30 g. A 0.60 mole batch of polymer requires 0.60 mole of terephthalic acid or its alkyl esters, such as dimethyl terephthalate (DMT; molecular weight = 194.19). Thus, 0.60 mole of this "acid fraction" of DMT is determined to be:

$$0.60 \; mole \times 194.19 \; g/mole = 116.51 \; g$$

Catalyst metals levels are reported in parts by weight of metal in million parts by weight of DMT. Thus, 98 ppm Ti is determined as:

$$0.60 \; mole \times \frac{194.19 \; g/mole}{1,000,000} \times 48 = 0.00559267 \; g \; Ti$$

The weight of other catalyst metals or other additives is calculated similarly.

The following examples are submitted for a better understanding of the invention.

Examples of Polymer Preparation

A 500 mL round bottom flask equipped with a ground glass head, a stirrer shaft, nitrogen inlet, and a side arm is charged with 97 g (0.5 mole) of dimethyl terephthalate, 62 g (1 mole) of ethylene glycol, 0.25 mL of a butanol solution of titanium tetraisopropoxide (0.96%) titanium, 1.55 mL of an ethylene glycol solution of manganese acetate tetrahydrate (0.49%) manganese, 1.95 mL of an ethylene glycol solution of cobalt acetate tetrahydrate (0.54%) cobalt and 3.30 mL of an ethylene glycol solution of antimony trioxide (0.96%) antimony. The flask is then immersed in a Belmont metal bath and heated with stirring for 1 hour at 200° C., 1 hour at 210° C. at atmospheric pressure under a nitrogen sweep. After the theoretical amount of methanol has been collected, 1.86 mL of a phosphorus compound (1.02% P) is added to the reaction mixture. The bath temperature is increased to 280° C. and the nitrogen inlet is clamped off and vacuum applied to reduce the pressure in the flash to 0.1 mm to 0.5 mm of mercury. The temperature is maintained at 280° C. with stirring at the reduced pressure for 1 hour and 15 minutes. The metal bath is then lowered away from the flask, the vacuum outlet clamped off, the nitrogen inlet opened and the flask allowed to come to atmospheric pressure under a nitrogen blanket. The polymer is allowed to cool to room temperature, and removed from the flask. The polymer has an inherent viscosity of 0.68. The polymer is then ground to pass a 20 mesh screen. The ground polymer is placed in a glass solid stating apparatus and solid stated at 220° C. until an inherent viscosity of 0.72±0.02 is attained.

The above is a typical example for the preparation of poly(ethylene terephthalate) using titanium catalyst. Poly(ethylene terephthalate) prepared using titanium-/alkali metal complex is made according to the above example except the alkali metal is included in the reaction mix. Table I shows poly(ethylene terephthalate) both with and without the titanium/alkali metal complex.

All polymers in the following examples are subjected to analysis of acetaldehyde via test that tracts head space analysis for acetaldehyde when a container (bottle) is blow molded and analyzed for acetaldehyde. The laboratory test that tracts "head space" acetaldehyde consists of the following:

(1) Polymer pellets are dried under conditions used for drying prior to molding parisons on a commercial scale.
(2) A die is placed in a melt indexer and the indexer set to 285° C.
(3) After temperature of indexer is stable at 285° C., approximately 7 grams of material is loaded into the barrel. A plunger is placed on top of the sample. A plug is placed at the bottom exit of the barrel.
(4) After 5 minutes, the material is pushed through the die into a water bath.
(5) The strands are then cut, placed in a sealed container, and placed in a freezer at −40° C.
(6) Steps 1-5 are repeated for 295° C. and 305° C..
(7) After the material has been cooled in the freezer for 2-4 hours, it is ground in a Wiley mill to pass through a 20 mesh screen.
(8) Approximately 0.05 gram is placed in a special gas chromatography tube.

Acetaldehyde is eluted from the polymer in the tube at 150° C. for 10 minutes and analyzed by gas chromatography. This laboratory method for analysis of acetaldehyde tracts the "head space" analysis for acetaldehyde which is normally conducted on a freshly blown bottle. Acetaldehyde in this test is reported in parts per million (ppm). The acetaldehyde test is run in duplicate and a standard polymer is run with each group of analysis. When polyesters are prepared containing alkali metal, the alkali metal salt is included in the catalyst mixture as in the above example.

Titanium/Metal Catalyst Preparation

The titanium/metal catalyst complex can be prepared in several ways. (1) The titanium tetraisoproxide (or other titanium alkoxides) is dissolved in ethylene glycol and the metal salt (Na, K, Li, Mg, etc.) is dissolved in ethylene glycol. The metal salt solution is then added to the titanium alkoxide solution to obtain the desired metal/titanium ratio which has been formed by experimentation to 0.25/1 or greater. The solution is stirred at room temperature. The metal/titanium complex is also prepared by adding ethylene glycol solutions of the titanium alkoxide and ethylene glycol solution of the soluble metal salt to the polyester reaction mix and stirring at room temperature. The metal/titanium complex can be prepared in the reaction mix in the presence of other adjuvant catalyst and stabilizers which are conventionally used in the preparation of polyesters.

EXAMPLES

Examples 1 through 32 in Table 1 show acetaldehyde analysis by the method which tracks "head space" analysis. The data is shown at three processing temperatures and the data is also reported as a percentage of the standard at each processing temperature which is a titanium based catalyst system analysis of which is shown in Example 32.

Example 1 is a poly(ethylene terephthalate) preparation prepared with the same catalyst system as the standard and shows essentially the same acetaldehyde levels at the three temperatures as the standard.

Examples 2 through 7 are poly(ethylene terephthalate) prepared using the metal/titanium complex as the catalyst system. These polymers are prepared with varying concentrations of titanium catalyst and different concentrations of the metal/titanium complex, also the source of the metal is different, sodium acetate and sodium carbonate. Also these examples show metal/titanium complex as catalyst alone and with and without other catalyst and additives, i.e. antimony, cobalt, manganese. All polymers contain some phosphorus stabilizers. All polymers in Example 2 through 7 prepared with the metal/titanium complex catalyst show reduced acetaldehyde as compared to the titanium catalyzed standard polymer which does not contain the metal/titanium complex. The overall reduction in acetaldehyde for Examples 2 through 7 is at least 50% at 285° C. processing.

Examples 8 through 19 show poly(ethylene terephthalate) prepared using the same titanium level but the ratio of the metal/titanium in the titanium metal complex ranges from 15 to 100 ppm sodium as analyzed in the polymer and is prepared with three different sodium sources, sodium carbonate, sodium bicarbonate, and sodium acetate. All polymers in Example 8 through 19 prepared with the metal/titanium complex catalyst show reduced "head space" acetaldehyde as compared to the standard or the control shown in Example 1 which were prepared with titanium catalyst but not with metal titanium complex catalyst. The overall reduction in "head space acetaldehyde" in Examples 8 through 19 is approximately 50% at the 285° C. processing temperature. This reduction in acetaldehyde is the result of using the metal/titanium complex catalyst rather than titanium alkoxide uncomplexed.

Examples 20 through 25 are prepared using metal/titanium complex catalyst with different source of the metal to form the complex, potassium acetate, potassium carbonate, and lithium carbonate. Also the metal/titanium ratio in the complex is varied while holding the titanium concentration in the polymer constant. The metal concentrations of potassium and lithium are 25 and 50 ppm as measured in the polymer. All polymers shown in Examples 20 through 25 show reduced "head space acetaldehyde" when compared to the standard and the control (Example 1) as a result of using the metal/titanium complex catalyst rather than titanium alone. The overall reduction in "head space acetaldehyde" for Examples 20 through 25 is approximately 50%.

Example 26 is a control sample for a non-titanium catalyzed poly(ethylene terephthalate). This polymer is prepared from a conventional catalyst system and stabilizer which is used by many manufacturers of poly(ethylene terephthalate) and is well known in the art. This poly(ethylene terephthalate) polymer does not contain titanium. The control polymers (Example 26) for non-titanium catalyzed poly(ethylene terephthalate) shows reduced "head space acetaldehyde" as compared to the titanium catalyzed standard and only slightly higher than the overall "head space acetaldehyde" shown in Examples 2 through 25 for polymers prepared using the metal/titanium complex catalyst.

Examples 27 through 31 show polymers prepared with the conventional catalyst system (Example 26) containing added sodium salts at concentrations of 25 to 100 ppm sodium where the sodium source is sodium carbonate or sodium acetate. Although all of the Examples 26 through 31 show lower "head space acetaldehyde" than the titanium catalyzed standard, no significant effect of adding sodium to the conventional catalyst on the "head space acetaldehyde". The data in Examples 27 through 31 illustrate that the mechanism for reducing "head space acetaldehyde" in a titanium catalyzed poly(ethylene terephthalate) polyester is a result of a metal/titanium complex and not the result of adding metal, sodium carbonate, sodium acetate or other soluble basic salts to conventional poly(ethylene terephthalate) reaction mixes. It further illustrates that the thermal stability of poly(ethylene terephthalate) as measured by "head space acetaldehyde", is enhanced by complexing a basic metal salt with a titanium alkoxide to form a catalyst which inhibits certain undesirable side reactions, namely the degradation product acetaldehyde.

TABLE 1

ACETALDEHYDE ANALYSIS OF POLY(ETHYLENE TEREPHTHALATE)

| EXAMPLE | I.V. | ADDITIVE (ppm) | | CATALYST (ppm) | | | | | ACETALDEHYDE (ppm) at | | | | | | ACETALDEHYDE % of standard | | |
|---|---|---|---|---|---|---|---|---|---|---|---|---|---|---|---|---|---|
| | | Na | Source | Ti | Mn | Co | Sb | P | 285 C STD | SPL | 295 C STD | SPL | 305 C STD | SPL | 285 C | 295 C | 305 C |
| 1 | 0.74 | 0 | 0 | 20 | 55 | 82 | 216 | 96 | 11.3 | 10.3 | 20.1 | 19.8 | 32.8 | 37.9 | 91.2 | 98.5 | 115.6 |
| 2 | 0.72 | 50 | NaOAc | 20 | 57 | — | — | 29 | 11.3 | 5.5 | 20.1 | 9.0 | 32.8 | 18.1 | 48.3 | 44.6 | 55.5 |
| 3 | 0.78 | 50 | NaOAc | 19 | 54 | 44 | — | 29 | 11.3 | 6.9 | 20.1 | 11.8 | 32.8 | 24.9 | 60.5 | 58.4 | 75.9 |
| 4 | 0.74 | 50 | NaOAc | 19 | 56 | — | — | 36 | 11.3 | 4.7 | 20.1 | 9.6 | 32.8 | 15.1 | 41.2 | 47.5 | 46.0 |
| 5 | 0.73 | 50 | NaOAc | 21 | 56 | 46 | — | 34 | 11.3 | 6.0 | 20.1 | 11.8 | 32.8 | 23.1 | 53.5 | 58.4 | 78.9 |
| 6 | 0.70 | 25 | Na2CO3 | 10 | — | — | 219 | 62 | 11.3 | 3.4 | 20.1 | 6.2 | 32.8 | 18.9 | 30.7 | 30.7 | 57.6 |
| 7 | 0.74 | 25 | Na2CO3 | 10 | — | — | 210 | 63 | 11.3 | 2.7 | 20.1 | 4.5 | 32.8 | 8.1 | 24.6 | 22.3 | 24.7 |
| 8 | 0.72 | 15 | Na2CO3 | 18 | 57 | 76 | 222 | 99 | 14.4 | 7.0 | 29.8 | 20.1 | 41.7 | 39.4 | 48.6 | 67.4 | 94.5 |
| 9 | 0.70 | 25 | Na2CO3 | 18 | 58 | 76 | 231 | 101 | 14.4 | 7.7 | 29.8 | 18.4 | 41.7 | 38.3 | 53.4 | 61.6 | 91.9 |
| 10 | 0.72 | 50 | Na2CO3 | 19 | 56 | 80 | 210 | 108 | 11.2 | 4.7 | 20.7 | 9.1 | 32.0 | 16.6 | 42.2 | 43.9 | 51.9 |
| 11 | 0.74 | 100 | Na2CO3 | 20 | 56 | 80 | 220 | 113 | 11.2 | 4.7 | 20.7 | 9.0 | 32.0 | 26.5 | 41.9 | 43.5 | 82.8 |
| 12 | 0.71 | 15 | NaHCO3 | 18 | 58 | 78 | 214 | 104 | 14.4 | 8.4 | 29.8 | 18.7 | 41.7 | 34.3 | 58.3 | 62.6 | 82.4 |
| 13 | 0.71 | 25 | NaHCO3 | 19 | 55 | 84 | 220 | 106 | 11.2 | 6.0 | 20.7 | 11.7 | 32.0 | 20.1 | 53.6 | 56.5 | 62.8 |
| 14 | 0.73 | 50 | NaHCO3 | 19 | 56 | 83 | 221 | 109 | 11.2 | 4.6 | 20.7 | 8.3 | 32.0 | 15.9 | 41.1 | 40.1 | 49.7 |
| 15 | 0.74 | 100 | NaHCO3 | 18 | 56 | 83 | 211 | 114 | 11.2 | 3.4 | 20.7 | 8.3 | 32.0 | 17.5 | 30.4 | 40.1 | 54.7 |
| 16 | 0.76 | 15 | NaOAc | 19 | 60 | 79 | 207 | 111 | 13.7 | 8.6 | 18.9 | 18.5 | 36.7 | 35.5 | 66.4 | 97.9 | 96.7 |
| 17 | 0.68 | 25 | NaOAc | 19 | 57 | 78 | 226 | 97 | 13.7 | 7.9 | 29.1 | 16.9 | 41.2 | 37.9 | 57.5 | 57.3 | 92.1 |
| 18 | 0.75 | 50 | NaOAc | 18 | 58 | 79 | 220 | 106 | 13.7 | 7.8 | 29.1 | 14.0 | 41.2 | 30.7 | 57.3 | 48.1 | 74.4 |
| 19 | 0.73 | 100 | NaOAc | 19 | 57 | 79 | 222 | 116 | 13.7 | 7.1 | 29.1 | 14.9 | 41.2 | 36.2 | 51.9 | 51.0 | 87.8 |
| 20 | 0.75 | 25 | KOAc | 19 | 58 | 78 | 226 | 102 | 16.8 | 8.8 | 34.0 | 19.3 | 41.2 | 35.6 | 52.8 | 56.8 | 86.4 |
| 21 | 0.77 | 50 | KOAc | 19 | 57 | 79 | 229 | 105 | 16.8 | 5.1 | 34.0 | 11.9 | 41.2 | 28.7 | 30.4 | 35.0 | 69.7 |
| 22 | 0.73 | 25 | K2CO3 | 19 | 59 | 80 | 224 | 99 | 16.8 | 8.0 | 34.0 | 20.8 | 41.2 | 35.3 | 47.6 | 61.2 | 85.6 |
| 23 | 0.70 | 50 | K2CO3 | 19 | 60 | 77 | 232 | 106 | 13.1 | 6.9 | 21.1 | 15.0 | 35.0 | 27.2 | 52.7 | 71.1 | 77.7 |
| 24 | 0.73 | 25 | Li2CO3 | 20 | 61 | 76 | 222 | 113 | 13.1 | 7.8 | 21.1 | 17.8 | 35.0 | 26.8 | 59.5 | 84.4 | 76.7 |
| 25 | 0.71 | 50 | Li2CO3 | 19 | 60 | 76 | 207 | 120 | 13.1 | 7.2 | 21.1 | 19.8 | 35.0 | 27.5 | 54.9 | 93.8 | 78.5 |
| 26 | 0.74 | 0 | 0 | — | 60 | 40 | 235 | 60 | 13.1 | 8.7 | 24.6 | 14.9 | 46.6 | 41.1 | 66.4 | 60.5 | 88.1 |
| 27 | 0.74 | 25 | Na2CO3 | — | 60 | 40 | 235 | 60 | 13.1 | 7.4 | 24.1 | 17.3 | 45.5 | 39.3 | 56.4 | 71.7 | 86.3 |
| 28 | 0.73 | 50 | Na2CO3 | — | 57 | 43 | 218 | 56 | 13.0 | 7.1 | 22.8 | 13.7 | 32.8 | 26.0 | 54.6 | 60.8 | 79.3 |
| 29 | 0.75 | 100 | Na2CO3 | — | 53 | 41 | 220 | 60 | 13.2 | 8.9 | 23.7 | 14.3 | 38.8 | 33.0 | 67.4 | 60.3 | 86.0 |
| 30 | 0.72 | 25 | NaOAc | — | 56 | 42 | 206 | 64 | 13.1 | 7.6 | 24.1 | 16.4 | 42.8 | 36.2 | 58.1 | 68.0 | 84.5 |
| 31 | 0.72 | 100 | NaOAc | — | 55 | 42 | 213 | 65 | 13.4 | 6.6 | 24.3 | 15.0 | 32.3 | 33.2 | 49.2 | 61.7 | — |
| 32 | | 0 | 0 | 20 | 60 | 80 | 220 | 100 | | | | | | | | | |

In Table 1, Examples 1-5, 16-19, and 30-31 use sodium acetate (NaOAc) as the additive; Examples 6-11 and 27-29 use sodium carbonate (Na2CO3); Examples 12-15 use sodium bicarbonate (NaHCO3); Examples 20-21 use potassium acetate (KOAc); Examples 22-23 use potassium carbonate (K2CO3); and Examples 24-25 use lithium carbonate (Li2CO3). Acetaldehyde at each temperature is measured for the sample (SPL) against a standard (STD) or control containing no alkali or alkaline earth metal salt.

Unless otherwise specified, all parts, percentages, ratios, etc. are by weight.

The invention has been described in detail with particular reference to preferred embodiments thereof, but it will be understood that variations and modifications can be effected within the spirit and scope of the invention.

I claim:

1. Process for producing polyesters comprising reacting dimethyl terephthalate with at least one glycol selected from ethylene glycol and combinations of ethylene glycol with up to about 10 mol % 1,4-cyclohexanedimethanol at a temperature sufficient to effect ester interchange and in the presence of a catalyst system comprising
   (a) manganese, zinc or calcium salts wherein the manganese, zinc or calcium is present in an amount of about 25-110 ppm,
   (b) cobalt salts wherein the cobalt is present in an amount of about 10-100 ppm,
   (c) an antimony compound wherein the antimony is present in an amount of about 150-350 ppm,
   (d) a phosphorus compound wherein the phosphorus is present in an amount of about 15-240 ppm, and
   (e) a complex of titanium alkoxide with an alkali or alkaline earth metal salt wherein the titanium is present in an amount of about 10-100 ppm titanium and wherein the metal: titanium atom ratio is at least 0.25:1, the ppm in (a) through (e) above being by weight based on the acid fraction of the polyester.

2. Process according to claim 1 wherein the salt of (a) is a manganese salt.

3. Process of claim 1 wherein said titanium alkoxide is selected from acetyl triisopropyl titanate, titanium tetraisopropoxide, titanium glycolates, titanium butoxide, hexylene glycol titanate or tetraisooctyl titanate.

4. Process of claim 1 wherein said organic salt of alkali metals and alkaline earth metals is selected from sodium carbonate, sodium acetate, sodium benzoate, sodium succinate, sodium acetylacetonate, sodium methoxide, sodium ethoxide, sodium glycoxide, lithium carbonate, lithium acetate, lithium benzoate, lithium succinate, lithium acetylacetonate, lithium methoxide, lithium ethoxide, lithium glycoxide, potassium acetate, potassium carbonate, potassium benzoate, potassium succinate, potassium acetylacetonate, potassium methoxide, potassium ethoxide, potassium glycoxide, calcium acetate, calcium benzoate, calcium succinate, calcium acetylacetonate, calcium methoxide, calcium ethoxide, calcium glycoxide, magnesium acetate, magnesium benzoate, magnesium succinate, magnesium acetylacetonate, magnesium methoxide, magnesium ethoxide, or magnesium glycoxide.

5. Process according to claim 1 wherein said complex of titanium alkoxide and alkali or alkaline earth metal salt is formed in situ in the reaction mix.

6. Process according to claim 1 wherein said alkali or alkaline earth metal salt is sodium or potassium carbonate.

7. Process of claim 2 wherein said manganese salt is selected from manganous benzoate tetrahydrate, manganese chloride, manganese oxide, manganese acetate, manganese acetylacetonate, manganese succinate, manganese diethyldithiocarbamate, manganese antimonate, manganic phosphate monohydrate, manganese glycoloxide, manganese naphthenate or manganese slicyl salicylate.

8. Process of claim 1 wherein said cobalt salt is selected from cobaltous acetate trihydrate, cobaltous nitrate, cobaltous chloride, cobalt acetylacetonate, cobalt naphthenate or cobalt salicyl salicylate.

9. Process of claim 1 wherein the said manganese salt is manganous benzoate tetrahydrate and the cobalt salt is cobaltous acetate trihydrate, the titanium alkoxide is acetyl triisopropyl titanate and the organic salt of an alkali metal or alkaline earth metal is sodium or potassium carbonate.

10. Process of claim 1 wherein a phosphate ester is added to the polyester reaction product of the ester interchange and said reaction product is polycondensed, said phosphate ester being present in the amount of about 13 to 240 ppm P based on the acid fraction of the polyester.

11. Process of claim 8 wherein said phosphate ester is selected from ethyl acid phosphate, diethyl acid phosphate, triethyl acid phosphate, aryl alkyl phosphate, tris-2-ethylhexyl phosphate, and a phosphate ester having the formula

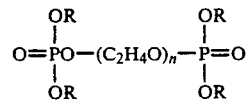

wherein n has an average value of 1.5 to about 3.0 and each R is hydrogen or an alkyl radical having from 6 to 10 carbon atoms, the ratio of the number of R groups of hydrogen atoms to the number of phosphorus atoms being about 0.25 to 0.50, and the ester has a free acidity equivalent of about 0.2 to 0.5.

12. Polyester produced by the process of claim 1.

* * * * *